United States Patent [19]

Nepper et al.

[11] 4,292,530
[45] Sep. 29, 1981

[54] DEVELOPER MATERIAL LEVEL SENSOR

[75] Inventors: Robert F. Nepper, North St. Paul; Dennis L. Peterson, Brooklyn Center, both of Minn.

[73] Assignee: Minnesota Mining and Manufacturing Company, Saint Paul, Minn.

[21] Appl. No.: 126,322

[22] Filed: Mar. 3, 1980

[51] Int. Cl.³ ............................................. G01N 21/26
[52] U.S. Cl. ...................................... 250/577; 350/61
[58] Field of Search ....................... 340/612, 617, 619; 356/438, 439, 436; 250/239, 573, 574, 575, 576, 577; 350/61

[56] References Cited

U.S. PATENT DOCUMENTS

| 1,937,721 | 12/1933 | Simon et al. | 356/439 |
| 1,937,722 | 12/1933 | Simon et al. | 250/239 X |
| 1,969,626 | 8/1934 | Simon et al. | 356/438 |
| 2,866,379 | 12/1958 | Veit | 250/573 |
| 2,892,378 | 6/1959 | Canada | 250/574 X |
| 3,593,842 | 7/1971 | Berg | 340/617 X |
| 3,644,914 | 2/1972 | Veasaw et al. | 250/573 |
| 3,731,091 | 5/1973 | Rosso et al. | 250/573 X |
| 3,873,197 | 3/1975 | Whited | 250/573 X |

OTHER PUBLICATIONS

Bilevel Optical Ink Level Detector by J. T. Loiselle; IBM Tech. Discl. Bull.; vol. 18, No. 4; p. 1095-1096; Sep. 1975.

Primary Examiner—John W. Caldwell, Sr.
Assistant Examiner—Daniel Myer
Attorney, Agent, or Firm—Cruzan Alexander; Donald M. Sell; Robert L. Marben

[57] ABSTRACT

Apparatus for providing an electrical signal when developer material for a copy machine recedes to predetermined level in a container for the material. The apparatus is positioned within the container and includes a light generating means directing light to a light to electric transducer. A cleaning member carried by a rotating arm is included which with rotation of the arm displaces any developer material that is present between the light generating means and the transducer means.

7 Claims, 4 Drawing Figures

DEVELOPER MATERIAL LEVEL SENSOR

BACKGROUND OF THE INVENTION

Field of the Invention

This invention relates to apparatus for a copy machine for determining whether the developer material in a container of the machine is at a predetermined level and in particular to such an apparatus which provides an electrical signal when there is an absence of the developer material at the predetermined level.

During operation of the copy machine the supply of developer material (liquid or powder) for the machine is normally out of view of the operator making it desirable that any apparatus provided to give an indication when the supply of developer material is not at a predetermined level be capable of providing such indication at a point where it can be readily seen by the operator. The remote indication can be easily provided when the apparatus provides an electrical signal which is initiated when the developer material recedes to a desired predetermined level. For example, an electrical signal can be used to control the operation of an indicating lamp located at a point within the view of operator. U.S. Pat. No. 3,593,842 to Richard C. Berg indicates that an attempt has been made to use a photocell toward which light is directed with the photocell being activated when the supply of developer material between the light source and the photocell is diminished. It is indicated that such an arrangement has been undesirable since the photocell may become coated with developer material and thus presents a condition where it will not be activated even when the entire supply of developer material has been used. Since the sensing portion of the photocell arrangement would be best located within the container for the developer material, periodic cleaning of the photocell arrangement is extremely difficult since containers for developer material are generally constructed in a manner where ready access to the interior of the container is not provided.

SUMMARY OF THE INVENTION

The invention presented herein provides an apparatus which is reliable in operation, and free of the developer material buildup problem noted in the prior art. The apparatus of the invention includes a container for developer material, a shaft mounted longitudinally of the container and adapted for rotation about the axis, an arm means secured to and extending radially from the shaft for movement with the shaft with a cleaning member secured to the free end portion of the shaft. A support means with a light generating means and a light to electric transducer means carried on said support means is provided so light from the light generating means is directed to the light to electric transducer. The support means is secured to the container to position the light generating means and the light to electric transducer means within the container and relative to the cleaning member so rotation of the arm means carries the cleaning member between the light generating means and the light to electric transducer means and in contact with the support means to remove any developer material between the light generating means and the light to electric transducer means that may be present to obstruct the passage of light from the light generating means to the light to electric transducer means. If the level of the developer material is not sufficient to allow developer material to again move between the light generating means and the light to electric transducer to obstruct the light path, the light to electric transducer will operate to provide an electric signal which can be used to operate a light source.

The support means may be a unitary structure having a base with two leg members extending from one side of the base, one leg member supporting the light generating means and the other leg member supporting the light to electric transducer means. The container for the developer material includes a wall member that is provided with a mounting hole through which the leg members are inserted to extend into the container with the base member secured to the outer surface of the wall member.

BRIEF DESCRIPTION OF THE DRAWINGS

For a more complete understanding of the invention, reference should be made to the accompanying drawing, wherein like functioning elements in each of the several figures are identified by the same reference characters, and wherein.

While the present invention is described in connection with a preferred embodiment thereof, it will be understood that it is not intended to limit the invention to that embodiment. On the contrary, it is intended to cover all alternatives, modifications and equivalents as may be included in the spirit and scope of the invention as defined by the appended claims.

DETAILED DESCRIPTION OF THE INVENTION

Figure 1:
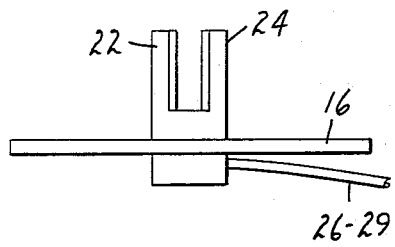
FIG. 1 is a side view of a portion of the apparatus of the invention.
Figure 3:
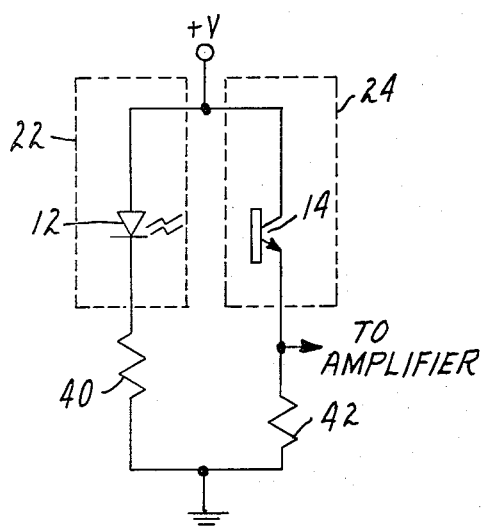
FIG. 3 is an electrical schematic of the circuitry contained in the apparatus of FIG. 1 and FIG. 2.

Referring to FIG. 1 of the drawing, a support means 10 is shown for the light generating means 12 and the light to electric transducer 14 of FIG. 3. The support means 10 includes the base portion 16 and two leg members 22 and 24 which extend from one side of the base portion, leg member 22 supporting the light generating means 12 and the other leg member 24 supporting the light to electrical transducer 14. The leg members 22 and 24 are spaced apart a short distance with the light from the light generating means 12 when it is energized directing light toward the light to electric transducer 14 carried by the leg 24.

Referring to FIG. 3, the light generating means 12 can take the form of a light emitting diode (LED). It is desirable to use a non-heat generating light generating means, such as an LED, since a high temperature at the leg member 22 can give rise to the buildup of developer material on the surface of the leg member impairing the operation of the apparatus. The light to electric transducer 14 can be provided by a phototransistor. As can be seen in FIG. 3, the LED and phototransistor require the use of four electrical leads. Such leads are represented by the conductors 26–29 inclusive which appear in FIG. 2. Other known light to electric transducers can also be used, such as a photodarlington, photoconductive and photovoltaic cells.

Figure 2:
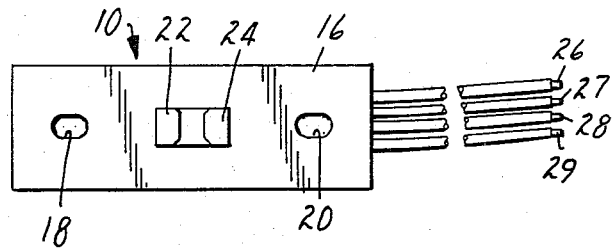
FIG. 2 is a top view of the apparatus of FIG. 1.
Figure 4:
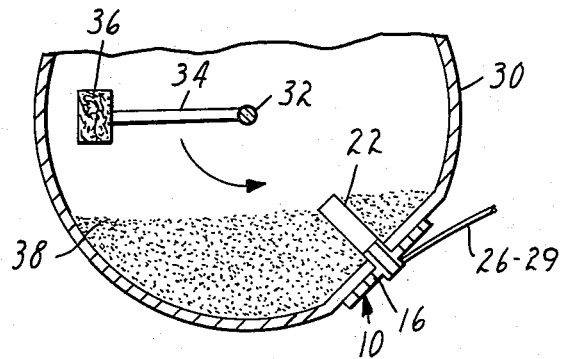
FIG. 4 is a partial sectional view of the container for developer material taken on a plane that is transversed to a longitudinal axis of the container disclosing the apparatus of the invention.

Referring to FIG. 4, a partial sectional view of a developer material container 30 taken on a plane that is transverse to the longitudinal axis of the container is shown with the device described in connection with FIGS. 1–3 mounted so that the leg members 22 and 24 extend into the container. To facilitate mounting of the support means 10, the container is formed with a flat portion for receiving the flat surface of the base portion 16 and an opening is provided in the wall of the container 30 through which the leg members 22 and 24 can be inserted. Mounting holes 18 and 20 provided in the base portion 16 allow the use of screws to secure the support means 10 to the container 30. The apparatus of this invention also includes a shaft 32 that is mounted for rotation within the container 30. An arm 34 is secured to the shaft 32 and extends radially from the shaft 32. It is positioned relative to the leg members 22 and 24 so that the arm 34 passes between the leg members as the shaft 32 is rotated. A cleaning member 36 is secured to the free end portion of the arm 34. The cleaning member 36 passes between and in contact with both opposed surfaces of leg members 22 and 24 to move any developer material that may be present from the space between the leg members and at the surface of the leg members. The cleaning member 36 can be a piece of material having a surface that makes good cleaning contact with the opposed surfaces of leg members 22 and 24. If the developer material is liquid in form, the cleaning member can be a piece of felt material. If the developer material is powder in form, a material or fabric having a bristle-like surface can be used for the cleaning member. Velvet material is suitable, for example. The container 30 is shown with a supply of developer material 38 in powder form. When the developer material level 38 is above the leg members 22 and 24, the developer material moves back in between the leg members 22 and 24 after the arm 34 and the cleaning member 36 has passed between the leg members. It can be seen, that as the developer material level recedes, a predetermined level for the developer material will be reached where powder will not move back between the leg members 22 and 24 after passage of the cleaning member 36 allowing light from the light generating means 12 carried by the leg 22 to be received continuously by light to electric transducer 14 between passages of the cleaning member 36 causing the light to electric transducer 14 to conduct in response to the light received. Such continuous conduction of the light to electric transducer 14 provides an indication that the level of the developer material 38 has receded to a predetermined level. It is preferred that the shaft 32 be rotated counterclockwise as shown in FIG. 4 to cause the cleaning member 32 to be carried from a point below the leg members 22 and 24 to the surface of the developer material 38.

Referring to FIG. 3 and the use of an LED for the light generating means 12 and a phototransistor for the light to electric transducer means 14, a positive voltage is applied to the anode of the LED and to the collector of the phototransistor. The cathode of the LED is connected to ground via a current limiting resistor 40 and the emitter of the phototransistor is connected to ground via a resistor 42. Conduction of the phototransistor due to light received from the LED causes a voltage to be developed across the resistor 42 which can be applied to an amplifier (not shown) the output of which can be utilized directly or indirectly to provide current flow to an indicating light. Operation of the indicating light will indicate the need for adding developer material to the container 30. It will be apparent to those of ordinary skill in the art that the voltage developed across the resistor 42 can be used in a number of ways such as the operation of a device for replenishing the developer material from a primary source of developer material.

The apparatus that has been described is readily maintained and is free of any problem with respect to developer material buildup at the light generating means 12 or the light to electric transducer means 14 as well as failure of the developer material in the light path to recede with the general level of the developer material which could be the case were the cleaning member 36 not provided for movement between the leg members 22 and 24 on a regular basis. It is normal practice to have the shaft 32 rotate during operation of a copy machine to move at least one wire loop carried by the shaft 32 through the developer material so the developer material will be dispensed from the container in a regular fashion. The addition of the arm 34 to the shaft 32 for movement between the legs 22 and 24 upon rotation of shaft 32 does not add any significant additional cost to the apparatus. When required, two wire loops (not shown) can be used on the shaft 32 when the apparatus of this invention is used, one loop on each side of the arm 34 and positioned to clear the legs 22 and 24.

What is claimed is:

1. Apparatus for use to provide an electrical signal when developer material for a copy machine recedes to a predetermined level including:
    a container for developer material,
    a shaft mounted longitudinally within said container and adapted for rotation about its axis,
    an arm means secured to and extending radially from said shaft for movement with said shaft,
    a cleaning member secured to the free end portion of said arm means,
    a light generating means,
    a light to electric transducer means,
    a support means carrying said light to electric transducer means and said light generating means so light from said light generating means is directed to said light to electric transducer means, said support means secured to said container and positioning said light generating means and said light to electric transducer means within said container in relation to the predetermined level for the developer material and relative to said cleaning member so rotation of said arms means carries said cleaning member between said light generating means and said light to electric transducer means and in contact with support means to displace any developer material that is present in the light path between said light generating means and said light to electric transducer means.

2. The apparatus according to claim 1 wherein said light generating means includes a light emitting diode.

3. The apparatus according to claim 1 wherein said support means includes a base member and two leg members extending from one side of said base member, one of said leg members carrying said light generating means and the other of said leg members carrying said light to electric transducer means.

4. The apparatus according to claim 1 wherein said cleaning member includes a material having a bristle-like surface.

5. The apparatus according to claim 1 wherein said cleaning member includes a material having a surface that makes good cleaning contact with said support means at said light generating means and said light to electric transducer means.

6. The apparatus according to claim 3 wherein said base member is secured to the outside surface of said container with said leg members positioned within said container.

7. The apparatus according to claim 1 wherein said shaft is adapted for rotation to carry said cleaning member from a point below the predetermined level to a point above the predetermined level when said cleaning member is carried between said light generating means and said light to electric transducer means.

* * * * *